No. 639,070. Patented Dec. 12, 1899.
J. H. LUDLOW.
HARROW.
(Application filed June 21, 1899.)
(No Model.) 2 Sheets—Sheet 1.
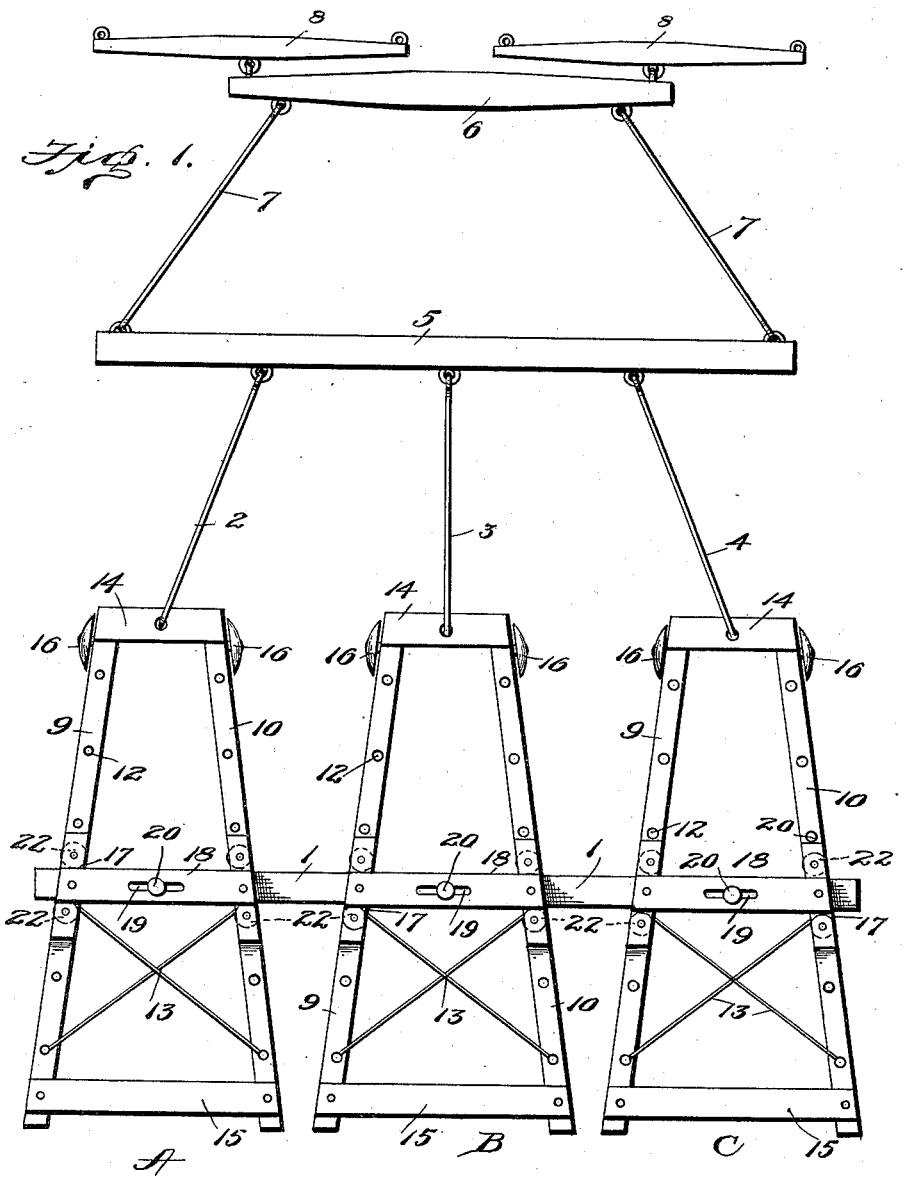

No. 639,070. Patented Dec. 12, 1899.
J. H. LUDLOW.
HARROW.
(Application filed June 21, 1899.)
(No Model.) 2 Sheets—Sheet 2.
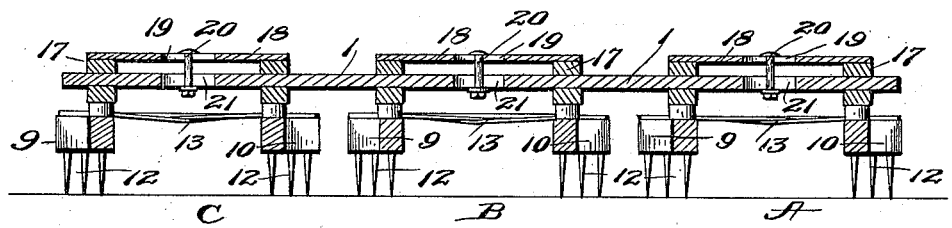
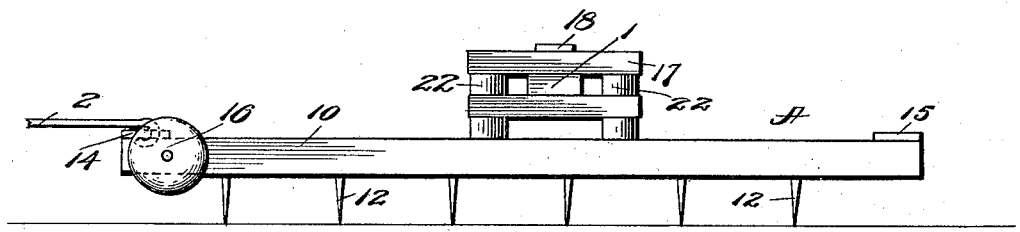
Witnesses
Inventor
J. H. Ludlow
by H. B. Willson & Co.
Attorneys

UNITED STATES PATENT OFFICE.

JOHN H. LUDLOW, OF FRANKLIN, NEBRASKA.

HARROW.

SPECIFICATION forming part of Letters Patent No. 639,070, dated December 12, 1899.

Application filed June 21, 1899. Serial No. 721,328. (No model.)

*To all whom it may concern:*

Be it known that I, JOHN H. LUDLOW, a citizen of the United States, residing at Franklin, in the county of Franklin and State of Nebraska, have invented certain new and useful Improvements in Harrows; and I do declare the following to be a full, clear, and exact description of the invention, such as will enable others skilled in the art to which it appertains to make and use the same.

The invention relates to improvements in harrows or cultivators, and more particularly to that class employed in listing corn.

The object of the present invention is to provide a simple, effective, and inexpensive improvement of this character.

To this end the invention consists in certain features of construction and combination of parts, which will be hereinafter fully described and claimed.

In the accompanying drawings, Figure 1 is a top plan view of my improved corn-harrow. Fig. 2 is a transverse section on the line of the coupling-bar. Fig. 3 is a side elevation of one of the harrow-sections. Fig. 4 is an enlarged detail perspective view of one of the revolving disks.

The harrow proper consists of three counterpart sections A B C, which are centrally connected by the coupling-bar 1 and drawn by the rods 2 3 4, pivoted to the draft-beam 5, to which the doubletree 6 is pivoted by the diverging rods 7 7, the outer ends of the said doubletree being pivoted to the two singletrees 8 8, to which the double team is hitched.

As each harrow-section is identical in construction, the description of one will suffice for the other two. Each section comprises two diverging beams 9 and 10, in which the teeth 12 are fixed, the two rear teeth on each side being connected by the cross-braces 13 13, and the front and rear ends of the beams are also connected by the transverse braces or bars 14 15.

16 16 denote saucer-shaped disks pivoted to the outside of the forward ends of the beams to assist in guiding the harrow in the furrows and also to help to pulverize the soil.

17 17 denote brackets fixed on top of the beams and connected by a transverse strap 18, provided with a slot 19, through which a coupling-pin 20 extends into a similar slot 21 in the coupling-bar 1 to permit the sections to adjust themselves laterally and conform to any variations in the line of the furrows. The brackets 17 are each provided with rollers 22 22, which extend on either side of the bar 1 and which divide the strain with the draft-beam 5.

The device is very simple and effective in operation, one man and a pair of horses being all that is required to manipulate it.

It will of course be understood that various changes in the form, proportion, and the minor details of construction may be resorted to without departing from the principle or sacrificing any of the advantages of my invention.

Having thus described the invention, what is claimed, and desired to be secured by Letters Patent, is—

A corn-harrow comprising the sections A B C, provided with the brackets 17 17 and guide-disks 16, the slotted straps 18 connecting said brackets, and the slotted coupling-bar 1 connecting said sections, substantially as and for the purpose set forth.

In testimony whereof I have hereunto set my hand in presence of two subscribing witnesses.

JOHN H. LUDLOW.

Witnesses:
H. WHITMORE,
I. E. WHITMORE.